United States Patent
Herath et al.

(10) Patent No.: US 12,223,351 B2
(45) Date of Patent: *Feb. 11, 2025

(54) SCHEDULING TASKS IN A PROCESSOR

(71) Applicant: Imagination Technologies Limited, Kings Langley (GB)

(72) Inventors: Isuru Herath, Cambridge (GB); Richard Broadhurst, Chipperfield (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,655

(22) Filed: Sep. 11, 2023

(65) Prior Publication Data

US 2023/0418668 A1     Dec. 28, 2023

Related U.S. Application Data

(63) Continuation of application No. 16/725,623, filed on Dec. 23, 2019, now Pat. No. 11,755,365.

(30) Foreign Application Priority Data

Dec. 21, 2018   (GB) ..................................... 1821182

(51) Int. Cl.
*G06F 9/44*   (2018.01)
*G06F 9/38*   (2018.01)
*G06F 9/48*   (2006.01)
*G06T 1/20*   (2006.01)

(52) U.S. Cl.
CPC .......... *G06F 9/4881* (2013.01); *G06F 9/3836* (2013.01); *G06F 9/3885* (2013.01); *G06T 1/20* (2013.01)

(58) Field of Classification Search
CPC .... G06F 9/4881; G06F 9/3836; G06F 9/3885; G06T 1/20
See application file for complete search history.

(56) References Cited

U.S. PATENT DOCUMENTS 6,785,889 B1 * 8/2004 Williams .................. G06F 9/50
                                                    709/240
7,949,855 B1   5/2011 Mills et al.
(Continued)

FOREIGN PATENT DOCUMENTS

GB         2560059 A       8/2018
WO     2013/165451 A1     11/2013

*Primary Examiner* — Cheng Yuan Tseng
(74) *Attorney, Agent, or Firm* — Potomac Law Group, PLLC; Vincent M DeLuca (57) ABSTRACT

A method of scheduling tasks in a processor comprises receiving a plurality of tasks that are ready to be executed, i.e. all their dependencies have been met and all the resources required to execute the task are available, and adding the received tasks to a task queue (or "task pool"). The number of tasks that are executing is monitored and in response to determining that an additional task can be executed by the processor, a task is selected from the task pool based at least in part on a comparison of indications of resources used by tasks being executed and indications of resources used by individual tasks in the task pool and the selected task is then sent for execution.

19 Claims, 3 Drawing Sheets

(56) References Cited

U.S. PATENT DOCUMENTS

| | | | |
|---|---|---|---|
| 8,032,888 B2 * | 10/2011 | Vengerov | G06F 9/505 |
| | | | 718/100 |
| 8,429,665 B2 * | 4/2013 | Zaroo | G06F 12/0804 |
| | | | 718/104 |
| 8,692,834 B2 * | 4/2014 | Peterson | G06T 1/20 |
| | | | 345/501 |
| 8,959,515 B2 * | 2/2015 | Qin | G06F 9/5022 |
| | | | 709/224 |
| 9,086,721 B2 * | 7/2015 | Jackson | G06F 9/00 |
| 9,430,288 B2 | 8/2016 | Wilson et al. | |
| 9,430,811 B2 * | 8/2016 | Peterson | G06F 9/5033 |
| 9,444,695 B2 * | 9/2016 | Dutta | H04L 41/0896 |
| 9,477,521 B2 * | 10/2016 | Truong | G06F 9/4887 |
| 9,606,833 B2 * | 3/2017 | Vrind | G06F 9/4887 |
| 9,740,526 B2 * | 8/2017 | Majewski | G06F 9/50 |
| 10,031,774 B2 | 7/2018 | Chen | |
| 10,037,511 B2 * | 7/2018 | Braham | G06Q 10/0631 |
| 10,185,591 B2 * | 1/2019 | Sato | G06F 9/5038 |
| 10,552,222 B2 * | 2/2020 | Wang | G06F 9/4881 |
| 11,099,890 B2 * | 8/2021 | Gutierrez | G06F 9/5005 |
| 11,275,590 B2 * | 3/2022 | Vincent | G06F 9/3814 |
| 2004/0019891 A1 | 1/2004 | Koenen | |
| 2005/0210472 A1 | 9/2005 | Accapadi et al. | |
| 2005/0240924 A1 * | 10/2005 | Jones | G06F 9/4881 |
| | | | 718/100 |
| 2007/0143759 A1 * | 6/2007 | Ozgur | G06F 9/5033 |
| | | | 718/102 |
| 2007/0143765 A1 * | 6/2007 | Aridor | G06F 9/5011 |
| | | | 718/104 |
| 2007/0273698 A1 * | 11/2007 | Du | G06F 9/30167 |
| | | | 712/E9.071 |
| 2013/0339971 A1 | 12/2013 | Boland et al. | |
| 2014/0282587 A1 | 9/2014 | Argon et al. | |
| 2014/0337389 A1 | 11/2014 | Ricketts et al. | |
| 2017/0109214 A1 | 4/2017 | Raman et al. | |

* cited by examiner

SCHEDULING TASKS IN A PROCESSOR

CROSS-REFERENCE TO RELATED APPLICATIONS AND CLAIM OF PRIORITY

This application is a continuation under 35 U.S.C. 120 of application Ser. No. 16/725,623 filed Dec. 23, 2019, now U.S. Pat. No. 11,755,365, which claims foreign priority under 35 U.S.C. 119 from United Kingdom Application No. 1821182.1 filed Dec. 21, 2018, the contents of which are incorporated herein by reference in their entirety.

BACKGROUND

A graphics processing unit (GPU) comprises a highly parallel structure which is designed to efficiently process large amounts of data in parallel. GPUs are typically used for computer graphics (e.g. to render images on a screen), however they may also be used for other operations which benefit from the parallelism they provide.

The embodiments described below are provided by way of example only and are not limiting of implementations which solve any or all of the disadvantages of known GPUs or other parallel processing units.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of scheduling tasks in a processor is described. The method comprises receiving a plurality of tasks that are ready to be executed, i.e. all their dependencies have been met and all the resources required to execute the task are available, and adding the received tasks to a task pool. The number of tasks that are executing is monitored and in response to determining that an additional task can be executed by the processor, a task is selected from the task pool based at least in part on a comparison of indications of resources used by tasks being executed and indications of resources used by individual tasks in the task pool and the selected task is then sent for execution.

A first aspect provides a computer-implemented method of scheduling tasks in a processor, the method comprising: receiving, at a scheduler, a plurality of tasks that are ready to be executed; adding the received tasks to a task pool; and in response to determining that an additional task can be executed by the processor, selecting a task from the task pool based at least in part on a comparison of indications of resources used by tasks being executed and indications of resources used by individual tasks in the task pool; and executing the selected task.

A parallel processing unit comprising: a scheduler; and a processing block, wherein the scheduler comprises: an input for receiving a plurality of tasks that are ready to be executed; a task pool comprising tasks that have been received; and logic arranged to: in response to determining that an additional task can be executed by the processing block, select a task from the task pool based at least in part on a comparison of indications of resources used by tasks being executed and indications of resources used by individual tasks in the task pool; and output the selected task for execution.

A method of manufacturing, using an integrated circuit manufacturing system, a parallel processing unit as described herein.

An integrated circuit definition dataset that, when processed in an integrated circuit manufacturing system, may configure the integrated circuit manufacturing system to manufacture a parallel processing unit as described herein.

A computer readable storage medium having stored thereon a computer readable description of an integrated circuit that, when processed in an integrated circuit manufacturing system, may cause the integrated circuit manufacturing system to manufacture a parallel processing unit as described herein.

An integrated circuit manufacturing system may be configured to manufacture a parallel processing unit as described herein.

An integrated circuit manufacturing system comprising: a non-transitory computer readable storage medium having stored thereon a computer readable description of an integrated circuit that describes a parallel processing unit; a layout processing system configured to process the integrated circuit description so as to generate a circuit layout description of an integrated circuit embodying the parallel processing unit; and an integrated circuit generation system configured to manufacture the parallel processing unit according to the circuit layout description, wherein the parallel processing unit comprises: a scheduler; and a processing block, wherein the scheduler comprises: an input for receiving a plurality of tasks that are ready to be executed; a task pool comprising tasks that have been received; and logic arranged to: in response to determining that an additional task can be executed by the processing block, select a task from the task pool based at least in part on a comparison of indications of resources used by tasks being executed and indications of resources used by individual tasks in the task pool; and output the selected task for execution.

The processor may be embodied in hardware on an integrated circuit. There may be provided a method of manufacturing, at an integrated circuit manufacturing system, a processor. There may be provided an integrated circuit definition dataset that, when processed in an integrated circuit manufacturing system, configures the system to manufacture a processor. There may be provided a non-transitory computer readable storage medium having stored thereon a computer readable description of an integrated circuit that, when processed, causes a layout processing system to generate a circuit layout description used in an integrated circuit manufacturing system to manufacture a processor.

There may be provided an integrated circuit manufacturing system comprising: a non-transitory computer readable storage medium having stored thereon a computer readable integrated circuit description that describes the processor; a layout processing system configured to process the integrated circuit description so as to generate a circuit layout description of an integrated circuit embodying the processor; and an integrated circuit generation system configured to manufacture the processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, GPUs can execute a large number of tasks in parallel and a scheduler within the GPU selects tasks for execution from a pool of tasks which are ready to be executed (e.g. because the resources required to execute the tasks are available). Methods and apparatus for scheduling within a GPU or other parallel processing unit (such as for high performance computing applications) are described herein. In particular, the methods described herein relate to scheduling of tasks once all their dependencies have been met and they have all the resources required to run.

The term 'task' is used herein to refer to a group of data-items and the work that is to be performed upon those data-items. For example, a task may comprise or be associated with a program or reference to a program (e.g. the same sequence of ALU instructions or reference thereto) in addition to a set of data that is to be processed according to the program, where this set of data may comprise one or more data elements (or data-items, e.g. a plurality of pixels or vertices).

The term 'program instance' is used herein to refer to individual instances that take a path through the code. A program instance therefore refers to a single data-item and a reference (e.g. pointer) to a program which will be executed on the data-item. A task therefore could be considered to comprise a plurality of program instances (e.g. up to 32 program instances), though in practice only a single instance of the common program (or reference) is required per task.

The methods described herein relate to scheduling of tasks which are ready to be executed (because all their dependencies have been met and they have all the resources required to run) to form a set of active tasks which are running and executing in a processing block within the GPU or other parallel processing unit. It will be appreciated that there may be many more 'ready tasks' (i.e. tasks in a 'ready state' as they are ready to be executed) than can be executed at any one time and the tasks that are in a ready state (and hence can be scheduled by the task scheduler) may be part of a queue, e.g. stored in a task pool. When the task is scheduled (i.e. selected from the queue) and becomes an active task, instructions from the scheduled task are sent to an instruction decoder to be decoded and then the decoded instructions are passed to an appropriate ALU for execution. After a task has been scheduled and hence transitioned from a ready state to an active state, the task may subsequently return to a non-active state (e.g. a ready state or other non-active state) before the task completes for various reasons. Such a task may then be re-scheduled by the scheduler (so that it transitions back to an active state) and in this way a task may be scheduled once or many times by the task scheduler described herein before the task completes.

It will be appreciated that there may be other levels of scheduling within a GPU in addition to the scheduling described herein, e.g. an earlier scheduling stage that schedules tasks for execution before they have all the resources required to run.

Each task in the task scheduler has associated state data which identifies the resources required by the task and may, additionally, identify the current state of the task, where a task may be active (i.e. executing on a processing block within the GPU or other parallel processing unit) or not active (i.e. not executing on a processing block within the GPU or other parallel processing unit). Whilst there may only be one possible active state, in various examples, there may be a plurality of different non-active states (e.g. as described in co-pending UK patent application number 1709649.6, published as GB2560059A).

As noted above, there may be many more ready tasks than active tasks and in various examples the number of active tasks may be determined by the latency of an instruction decoder within the processing block multiplied by the number of instruction decoders, e.g. such that if the latency of the instruction decoder is 7 clock cycles and there are two instruction decoders, there will be 14 active tasks. Once the maximum number of active tasks is reached, another ready task cannot become active until one of the currently active tasks is de-activated (e.g. by being placed into a non-active state). Once the number of active tasks falls below the maximum permitted number, the task scheduler selects a ready task to become active. Described herein is a method of selecting a task, from the available ready tasks, to schedule (and hence become active) and this method may be used on its own or in combination with any other non-contradictory task selection scheme, e.g. it may be used in combination with a task selection scheme that selects the oldest task (e.g. based on creation time) or that selects the task that has been in the ready state for the longest to become active. Where the method described herein is used in combination with other task selection schemes, each task selection scheme may be based on different criteria and tasks are selected and scheduled based on a combination of all these criteria.

Methods and apparatus for scheduling tasks within a GPU or other parallel processing unit can be described with reference to FIGS. 1-3.

Figure 1:
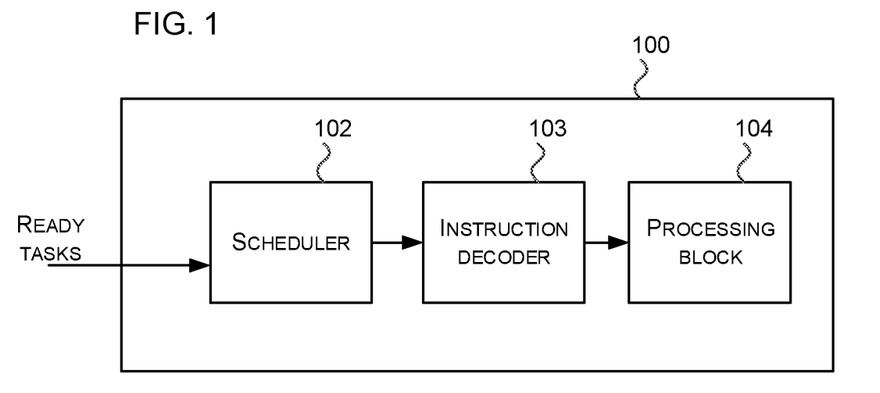
FIG. 1 is a schematic diagram showing a processor which may be a GPU or other parallel processing unit.

FIG. 1 is a schematic diagram showing a processor 100 which may be a GPU or other parallel processing unit. It will be appreciated that FIG. 1 only shows some elements of the processor and there may be many other elements (e.g. caches, interfaces, etc.) within the processor that are not shown in FIG. 1. The processor 100 comprises a scheduler 102, an instruction decoder 103 and a processing block 104.

The processing block 104 comprises hardware logic for executing the instructions within tasks that are scheduled for execution by the scheduler 102 and which have been decoded by the instruction decoder 103. The processing block 104 therefore comprises many arithmetic logic units (ALUs) and the ALUs may be grouped in any way. The processing block 104 may comprise different types of ALUs, e.g. with each type of ALU being optimized for a particular type of computation. In examples where the processor 100 is a GPU, the processing block 104 may comprise a plurality of shader cores, with each shader core comprising one or more ALUs. In various examples, the processing block 104 may be a single-instruction multiple-data (SIMD) processor (which may in various examples be referred to as a Unified Shading Cluster (USC)) or a single-instruction single-data (SISD) processor.

The scheduler 102 schedules tasks that are in a ready state (i.e. tasks where all the dependencies have been met and all the required resources have been allocated the task) and, as described above, there may be additional schedulers (not shown in FIG. 1) that schedule tasks before they are in a ready state. As noted above, only a proper subset of the ready tasks received by the scheduler 102 can be scheduled and hence be in an active state (i.e. running and executing in the processing block 104) at any time.

Figure 2:
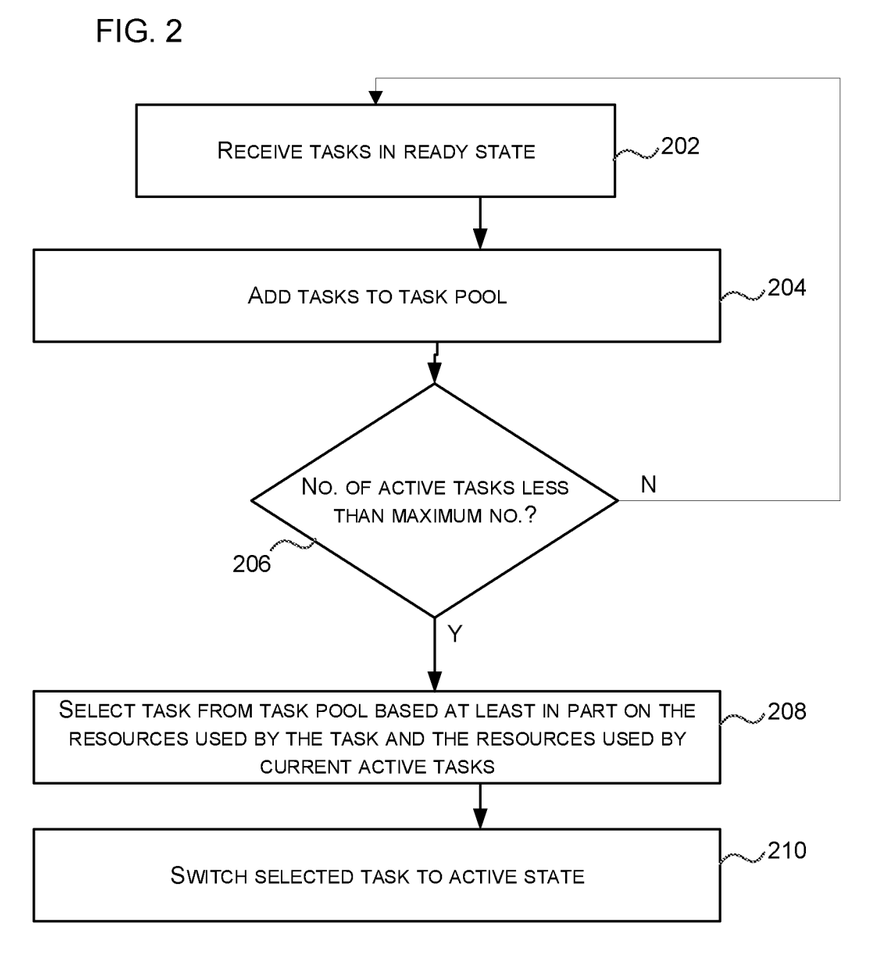
FIG. 2 is a flow diagram showing an example scheduling method which may be implemented by the scheduler in the processor of FIG. 1.

FIG. 2 is a flow diagram showing an example scheduling method which may be implemented by the scheduler 102. As shown in FIG. 2, a plurality of ready tasks are received (block 202) and added to a task pool or queue (block 204). The number of active tasks is monitored by the scheduler 102 and when the number of active tasks falls below the maximum number of active tasks ('Yes' in block 206), a task from the task pool is selected based on a comparison of the resources used by the task and the resources used by the current active tasks (block 208) and the selected task is then scheduled (block 210), i.e. it becomes active, is removed from the task pool and is executed in the processing block 104. As described in more detail below, the comparison identifies a task from the task pool which uses (or will use, when executing) resources in common with one or more of the currently active tasks.

In various examples, the resources used by a task may be expressed in terms of a processing state for the task, where tasks with the same processing state run the same program (e.g. shader) using the same resources (e.g. the same textures), and the selection (in block 208) may be made based on a comparison of processing states of tasks. The processing state may be referred to as a "3D state", and examples of the processing state include a render state, a draw state and a rasterization state. The resources required to execute a task are indicated by the processing state. The resources may be textures or buffers; furthermore, the program being executed can also be considered to be a resource. The selection (in block 208) may, where possible, select a task with the same processing state as at least one of the current active tasks and in various examples, with the same processing state as a majority of the current active tasks. This is shown in the example of FIG. 3 and described below. Tasks with the same processing state may, for example, be drawing duplicates of the same object (e.g. multiple identical objects (e.g. mugs) within a scene) or may be drawing different parts of the same object (e.g. where the object comprises more than 32 pixels). In examples where there are more than one task in the task pool with the same processing state as the majority of the current active tasks, one of these tasks may be selected based on other criteria (e.g. based on the age of the task or at random). It will be appreciated that where no task with a matching processing state is present in the task pool (i.e. no such task is available for scheduling), a task with a different processing state may be selected based on other criteria (e.g. selection of a most similar processing state, selection based on individual textures as described below, selection based on the age of the task, etc.) or a task may be selected at random from the task pool.

Figure 3:
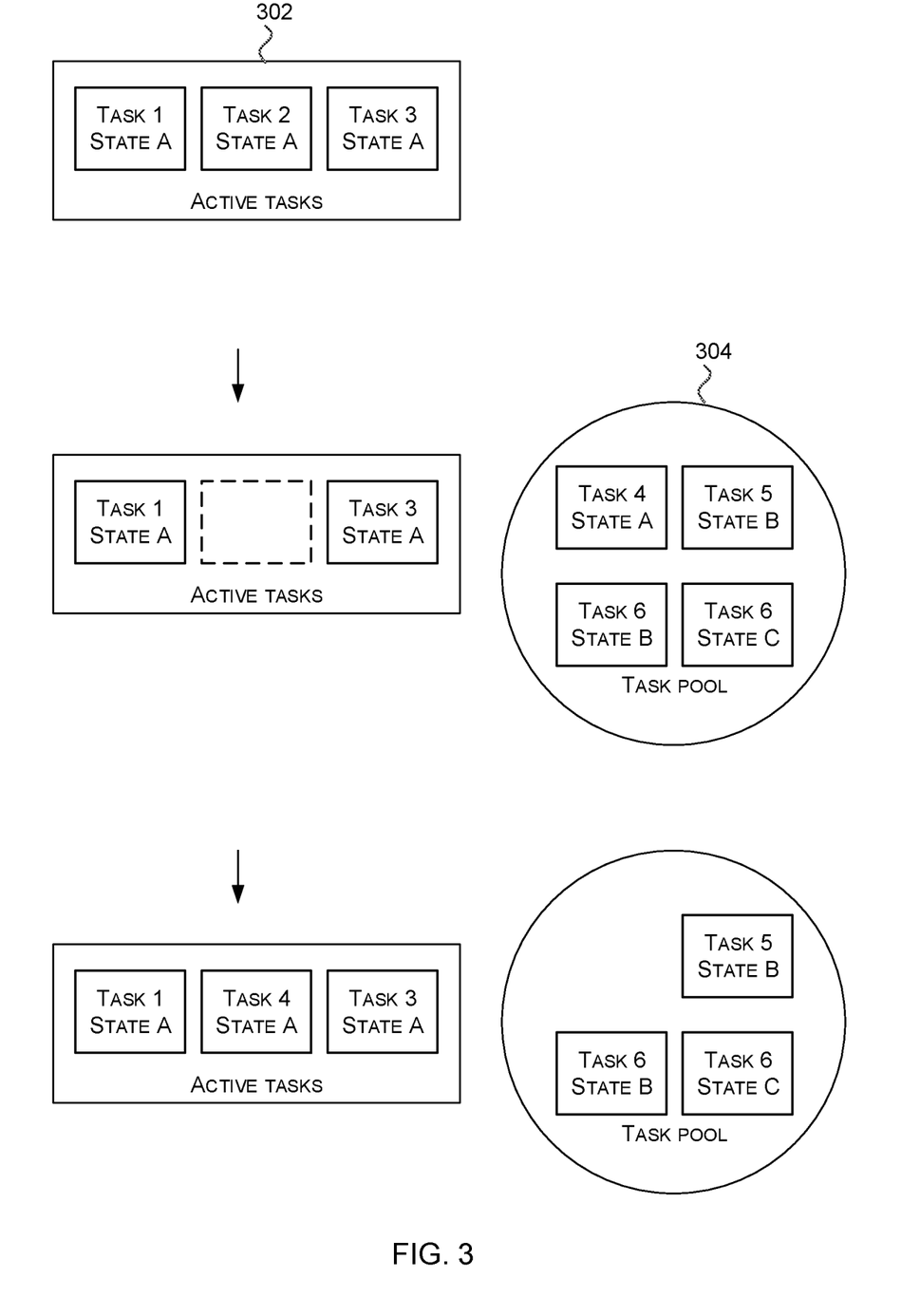
FIG. 3 is a schematic diagram illustrating an example scheduling operation.

FIG. 3 shows an active task group 302 that initially comprises three tasks, Task1, Task2 and Task3 which all have the same processing state, state A. In the example shown in FIG. 3, Task2 encounters a time consuming operation (e.g. a fetch from system memory) and is therefore de-scheduled (and hence is no longer part of the active task group 302). There are now fewer active tasks than the maximum number of active tasks ('Yes' in block 206) and so a new task needs to be selected from the task pool 304 for inclusion within the active task group 302. According to the method described herein, this selection is made (in block 208) based on a comparison of the processing state of the tasks in the active task group 302 and the processing state of individual tasks in the task pool 304. It can be seen that in this example, only Task4 from the task pool 304 has the same processing state as the tasks in the active task group 302, i.e. state A, and hence Task4 is selected and added to the active task group 302. Whilst the example of FIG. 3 shows the selection of a task from the task pool that has the same state as all the tasks in the active task group, it will be appreciated that in other examples, the task that is selected may only be in the same state as a subset (e.g. a proper subset) of the tasks in the active task group (e.g. the largest subset of tasks in the active task group that are in the same state) or, where there is no task in the task pool with the same state as a task in the active task group, the task in the task pool with a most similar state to one or more of the tasks in the active task group may be selected.

By selecting a task with the same processing state as at least one of the current active tasks in block 208 (e.g. by selecting a task with the most common processing state of the current active tasks, e.g. the processing state of the majority of the current active tasks), the cache performance (i.e. the number of cache hits) is improved. This results in less bandwidth utilization and a shorter execution time, which in turn results in a reduced power consumption. The improvement in cache performance is achieved because tasks with the same processing state often refer to the same texture and use the same resources and so there is a higher probability that data required by one of the tasks will already have been requested by another task and so will already be in the cache (rather than having to be read from memory). If instead a task with a different processing state was selected (in block 208), not only would the task request data from a different texture, but when fetched, the fetched data may trigger the eviction of data from the cache that is being used by the other tasks in the active task group, thereby increasing the number of cache misses. This is particularly true where tasks in the active task group are executed using a round-robin policy. For example, if Task5 had been selected (in block 208) instead of Task4, there is a likelihood that data fetched by Task1 may have been evicted to make room for data fetched by Task5 by the time the round-robin policy reaches Task3, which shares a processing state with Task1 and hence may request the same data as previously fetched by Task1.

In various examples, the processing state information for each task may not be available to the scheduler 102 and so the processing state information cannot be used to make the selection (in block 208). Instead, a list of resources (e.g. one or more of textures, buffers, surfaces or programs) accessed by each task may be used instead to make the selection (in block 208), with a list of resources (e.g. textures) accessed by the tasks in the active task group 302 being compared against the resources (e.g. textures) accessed by individual tasks in the task pool 304. In various examples, the comparison may identify one or more ready tasks in the task pool that have at least some overlap in resources used with one of the current active tasks and in various examples, where more than one ready task is identified, the ready task with the largest overlap may be selected. Whilst comparing lists of resources (e.g. textures) may be more complex than comparing processing state information, it may provide additional opportunities to select tasks, and hence improve cache performance, bandwidth utilization, execution time and power consumption. For example, whilst a task that is drawing a laptop and a task that is drawing a power supply may have different 3D states, they may both access the same texture (e.g. because of the visual similarity of the surfaces of the two objects).

In various examples, selection based on a list of resources (e.g. textures) accessed by a task may be used (in block 208) in the event that there is no task in the task pool 304 that has the same state as any of the tasks in the active task group 302.

The selection (in block 208) may be made solely based on an assessment of the resources used by the task and the resources used by the current active tasks or the selection may be made based on this assessment in combination with one or more other criteria, such as the age of the task and/or the length of time that the task has been in the ready state. In various examples, the order in which the criteria are applied may differ. For example, the selection may identify all tasks in the task pool that have the same processing state as one or more of the currently active tasks and then one of those identified tasks may be selected based on its age or the length of time since the task most recently became ready to be executed. In another example, the selection may identify a group of oldest tasks (e.g. based on creation time) and then a further selection may be made, from the group of oldest tasks, based on an assessment of the resources used by the task and the resources used by the current active tasks.

In the methods described above, the selection (in block 208) is made based on a comparison of current active tasks and the tasks in the task pool. In various examples, this comparison may be modified such that the tasks in the task pool are compared (e.g. in terms of state and/or resources) to both the current active tasks and any tasks that are likely to become active in the future. In such an example, in the absence of any task in the same or similar state in the task pool (or with the same or similar resources), then a task may be selected from the task pool that is least similar to the set of tasks that are likely to become active in the future. In this way, selection of a task which is similar to tasks that are likely to become active in the future can be delayed until those similar tasks become active.

Use of the method of scheduling described above may result in improvements in cache performance even in systems where tasks are created in state order. This is because although the tasks are created in state order, by the time that individual tasks are in the ready state, the original order of the tasks has been lost (e.g. because of the time taken to do texture fetch or otherwise because of variations in the time taken for a task to become ready).

The method of scheduling described above may be implemented in software or hardware or any combination thereof. In various examples, the selection of a task (in block 208) may be implemented by logic within the scheduler 102. This logic may be hardware logic or may be implemented in software.

Figure 4:
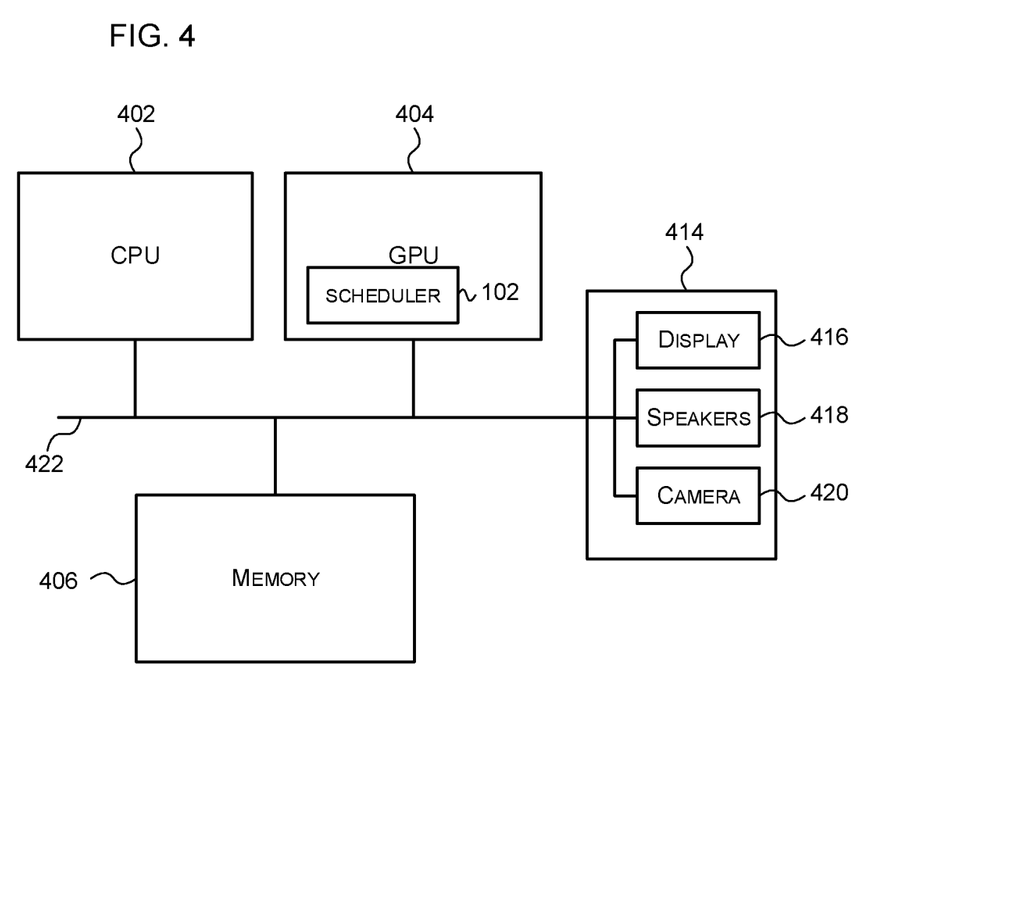
FIG. 4 shows a computer system in which a graphics processing system is implemented.

FIG. 4 shows a computer system in which the scheduler described herein may be implemented. The computer system comprises a CPU 402, a GPU (or other parallel processing unit) 404, a memory 406 and other devices 414, such as a display 416, speakers 418 and a camera 420. The scheduler 102 may be part of the GPU 404 and the textures that are fetched may be stored in memory 406. The components of the computer system can communicate with each other via a communications bus 422.

The processor 100 of FIG. 1 is shown as comprising a number of functional blocks. This is schematic only and is not intended to define a strict division between different logic elements of such entities. Each functional block may be provided in any suitable manner. It is to be understood that intermediate values described herein as being formed by any part of the processor need not be physically generated by the processor at any point and may merely represent logical values which conveniently describe the processing performed by the processor between its input and output.

The processor comprising a scheduler as described herein may be embodied in hardware on an integrated circuit. The processors described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor comprising a scheduler as described herein will now be described with respect to FIG. 5.

Figure 5:
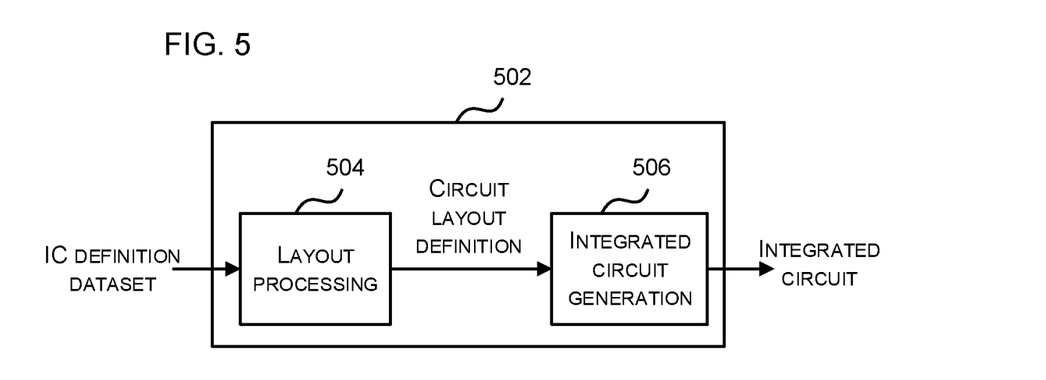
FIG. 5 shows an integrated circuit manufacturing system for generating an integrated circuit embodying a graphics processing system.

FIG. 5 shows an example of an integrated circuit (IC) manufacturing system 502 which is configured to manufacture a processor as described in any of the examples herein. In particular, the IC manufacturing system 502 comprises a layout processing system 504 and an integrated circuit generation system 506. The IC manufacturing system 502 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 502 to manufacture an integrated circuit embodying a processor as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of scheduling tasks in a processor, the method comprising:
    in response to determining that an additional task can be executed by the processor, selecting a task from a plurality of received tasks that are ready to be executed based at least in part on a comparison of indications of resources used by tasks being executed and indications of resources used by individual tasks in the plurality of received tasks; and
    executing the selected task.

2. The method according to claim 1, wherein each task has an associated processing state which is an indication of resources used by that task, wherein tasks in an identical processing state execute the same program using the same resources and wherein selecting a task from the plurality of received tasks based at least in part on a comparison of indications of resources used by tasks being executed and indications of resources used by individual tasks in the plurality of received tasks comprises:
    selecting a task from the plurality of received tasks having an associated processing state that matches the associated processing state of at least one of the tasks being executed.

3. The method according to claim 2, wherein selecting a task from the plurality of received tasks having an associated processing state that matches the associated processing state of at least one of the tasks being executed comprises:
    selecting a task from the plurality of received tasks having an associated processing state that matches the associated processing state of a majority of the tasks being executed.

4. The method according to claim 1, wherein each task has an associated list of resources used by the task and wherein selecting a task from the plurality of received tasks based at least in part on a comparison of indications of resources used by tasks being executed and indications of resources used by individual tasks in the plurality of received tasks comprises:
    selecting a task from the plurality of received tasks having at least one resource in common with one of the tasks being executed.

5. The method according to claim 4, wherein selecting a task from the plurality of received tasks having at least one resource in common with one of the tasks being executed comprises:
    selecting a task from the plurality of received tasks having most resources in common with the tasks being executed.

6. The method according to claim 1, wherein the resources are textures.

7. The method according to claim 1, wherein the task is selected based on the comparison of indications of resources and at least one other criteria.

8. The method according to claim 7, wherein the at least one other criteria comprises one or more of: age of the task and length of time since the task was added to the plurality of received tasks.

9. A parallel processing unit comprising:
    a scheduler; and
    a processing block;
    wherein the scheduler comprises logic arranged to:
    in response to determining that an additional task can be executed by the processing block, select a task from a plurality of received tasks that are ready to be executed based at least in part on a comparison of indications of resources used by tasks being executed and indications of resources used by individual tasks in the plurality of received tasks; and
    output the selected task for execution.

10. The parallel processing unit according to claim 9, wherein each task has an associated processing state which is an indication of resources used by that task, wherein tasks in an identical processing state execute the same program using the same resources and wherein the logic is arranged to select a task from the plurality of received tasks based at least in part on a comparison of indications of resources used by tasks being executed and indications of resources used by individual tasks in the plurality of received tasks by:
    selecting a task from the plurality of received tasks having an associated processing state that matches the associated processing state of at least one of the tasks being executed.

11. The parallel processing unit according to claim 10, wherein selecting a task from the plurality of received tasks having an associated processing state that matches the associated processing state of at least one of the tasks being executed comprises:
    selecting a task from the plurality of received tasks having an associated processing state that matches the processing associated state of a majority of the tasks being executed.

12. The parallel processing unit according to claim 9, wherein each task has an associated list of resources used by the task and wherein the logic is arranged to select a task from the plurality of received tasks based at least in part on a comparison of indications of resources used by tasks being executed and indications of resources used by individual tasks in the plurality of received tasks by:
    selecting a task from the plurality of received tasks having at least one resource in common with one of the tasks being executed.

13. The parallel processing unit according to claim 12, wherein selecting a task from the plurality of received tasks having at least one resource in common with one of the tasks being executed comprises:
    selecting a task from the plurality of received tasks having most resources in common with the tasks being executed.

14. The parallel processing unit according to claim 9, wherein the resources are textures.

15. The parallel processing unit according to claim 9, wherein the logic is arranged to select a task based on the comparison of indications of resources and at least one other criteria.

16. The parallel processing unit according to claim 15, wherein the at least one other criteria comprises one or more of: age of the task and length of time since the task was added to the plurality of received tasks.

17. A parallel processing unit configured to schedule tasks in a processor by selecting a task from a plurality of received tasks that are ready to be executed based at least in part on a comparison of indications of resources used by tasks being executed and indications of resources used by individual tasks in the plurality of received tasks, as set forth in claim 1.

18. The parallel processing unit of claim 9, wherein the graphics processing system is embodied in hardware on an integrated circuit.

19. A non-transitory computer readable storage medium having stored thereon computer readable code configured to perform a computer-implemented method of scheduling tasks in a processor, comprising:
 in response to determining that an additional task can be executed by the processor, selecting a task from a plurality of received tasks that are ready to be executed based at least in part on a comparison of indications of resources used by tasks being executed and indications of resources used by individual tasks in the plurality of received tasks; and
executing the selected task.

\* \* \* \* \*